(12) United States Patent
Aung et al.

(10) Patent No.: US 12,124,804 B2
(45) Date of Patent: Oct. 22, 2024

(54) ORDERING FROM A MENU USING NATURAL LANGUAGE

(71) Applicant: SoundHound, Inc., Santa Clara, CA (US)

(72) Inventors: Joe Kyaw Soe Aung, San Jose, CA (US); Vincent Garcia, Sacramento, CA (US); Junru Ren, Sunnyvale, CA (US)

(73) Assignee: SoundHound, Inc.

( * ) Notice: Subject to any disclaimer, the term of this patent is extended or adjusted under 35 U.S.C. 154(b) by 378 days.

(21) Appl. No.: 17/716,482

(22) Filed: Apr. 8, 2022

(65) Prior Publication Data

US 2023/0289530 A1   Sep. 14, 2023

Related U.S. Application Data

(60) Provisional application No. 63/318,167, filed on Mar. 9, 2022.

(51) Int. Cl.
| | |
|---|---|
| *G06F 17/00* | (2019.01) |
| *G06F 40/295* | (2020.01) |
| *G06F 40/40* | (2020.01) |
| *G06N 5/022* | (2023.01) |
| *G10L 15/26* | (2006.01) |

(52) U.S. Cl.
CPC ............ *G06F 40/295* (2020.01); *G06F 40/40* (2020.01); *G06N 5/022* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 6,868,422 B2 * | 3/2005 | Turner | G06N 5/022 |
| | | | 707/999.102 |
| 9,461,876 B2 * | 10/2016 | Van Dusen | G06F 16/90335 |
| 10,957,310 B1 | 3/2021 | Mohajer et al. | |
| 11,080,336 B2 * | 8/2021 | Van Dusen | G06Q 10/10 |
| 11,734,365 B1 * | 8/2023 | Gottlob | G06F 16/906 |
| | | | 707/769 |
| 2017/0308523 A1 * | 10/2017 | Wang | G06F 40/232 |
| 2022/0107802 A1 * | 4/2022 | Rao | G06F 16/907 |

* cited by examiner

*Primary Examiner* — Satwant K Singh
(74) *Attorney, Agent, or Firm* — Young's Patent Services; Bruce A Young

(57) ABSTRACT

A computer system ingests a catalog of a plurality of items. The catalog is specific to a particular domain and including names for individual items of the plurality of items. One or more attributes are respectively associated to the individual items of the plurality of items. A specialist grammar specific to the particular domain of the catalog is obtained and a programming language code to interpret natural language input related to the catalog is generated using the specialist grammar, and the names for the individual items of the plurality of items and their associated one or more attributes.

37 Claims, 7 Drawing Sheets

ORDERING FROM A MENU USING NATURAL LANGUAGE

CROSS-REFERENCE TO RELATED APPLICATIONS

This application is a claims benefit under 35 U.S.C. § 119 to provisional U.S. Patent Application 63/318,167 entitled ORDERING FROM A MENU USING NATURAL LANGUAGE, filed on Mar. 9, 2022, the contents of which are incorporated by reference herein for any and all purposes.

TECHNICAL FIELD

The present subject matter relates to computer-based interpretation of natural language and more specifically to systems that are customized for natural language understanding in a predetermined environment.

BACKGROUND

Automatic speech recognition and using natural language as an input to a computer system have become increasing common over the last several years. Digital assistants such as Google Assistant™, Alexa®, and Siri® are widely used for many different tasks. Interactive Voice Response systems are nearly ubiquitously deployed by companies for their customer service lines. People have come to expect to be able to interact with computers using their voice instead of a keyboard or even in place of a modern touchscreen-based interface.

But even though automatic speech recognition with computer-based natural language processing has become common, it still is not as reliable as speaking to another human. In contrast to a human-to-human conversation, computer-based systems often lack context about what is being said, which can lead to recognition errors and incorrect responses. This can be frustrating for the user and lead to dissatisfaction with the business that is running the system.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1:
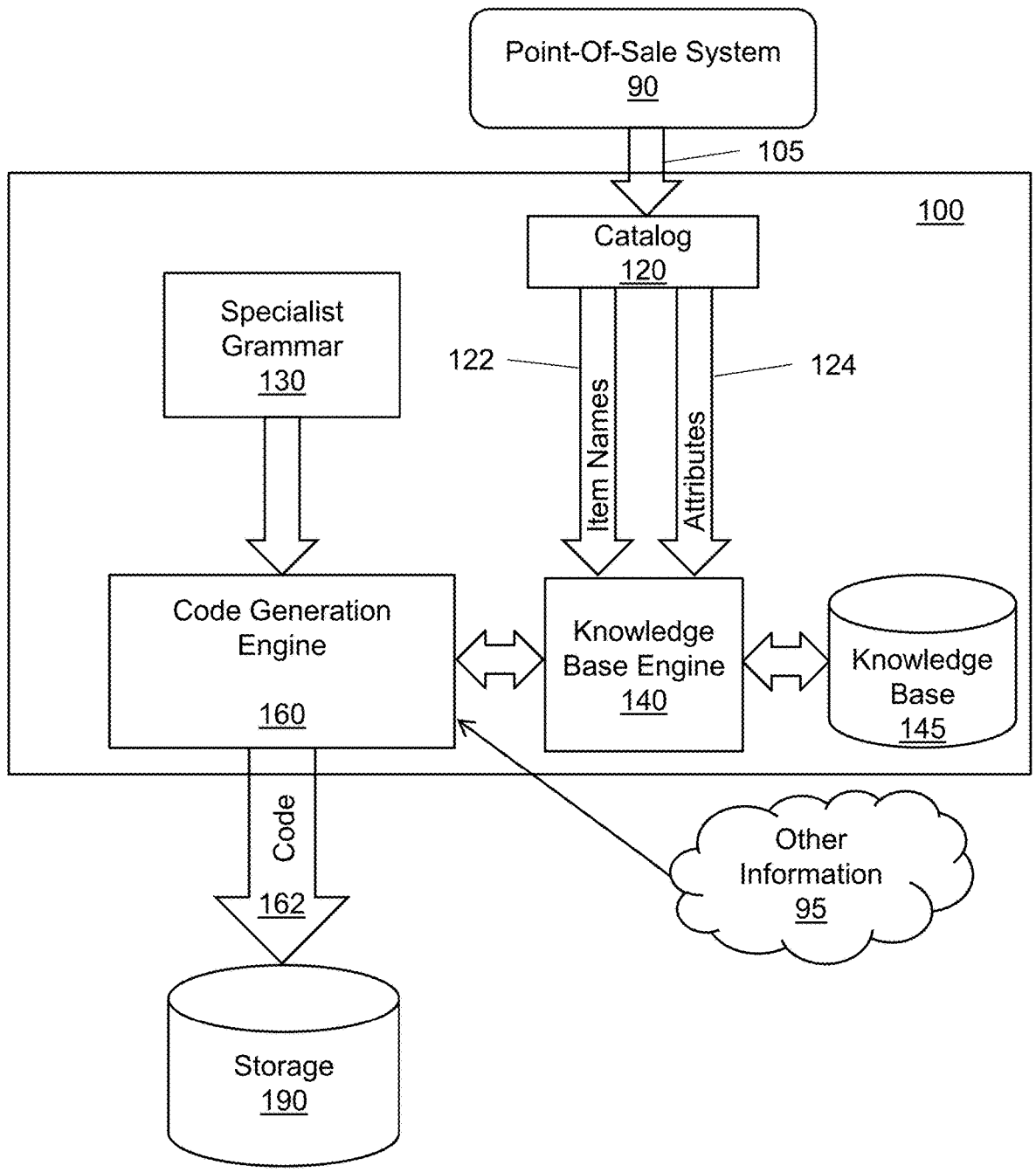
FIG. 1 shows a block diagram of an embodiment of a system to generate code to interpret natural language related to a specific catalog.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Disclosed herein are systems, methods, and computer program products embodied as computer instructions stored on a non-transitory computer-readable medium for interpreting natural language text related to a catalog of items. The catalog may include attributes for the listed items, such as a category for the item (e.g. entrée or appetizer), options (e.g. a size or variations such as type of dressing for a salad), and/or price. The catalog can be obtained, or ingested, in any way, including, but not limited to, interfacing with a Point-of-Sale system to receive the catalog, receiving a file containing structured text such as a JavaScript Object Notation (JSON) or an eXtensible Markup Language (XML) document, receiving a file containing unstructured text, scanning a physical copy of the catalog and performing optical character recognition (OCR), or receiving user input into a graphical user interface (GUI).

The catalog of items is specific to a particular domain. Non-limiting examples of catalogs particular to a domain that may be usable in embodiments include, a menu from the restaurant industry, a listing of available tickets for upcoming events from the event-ticket industry, a catalog of automobile parts from the retail automobile parts industry, or any other type of grouping of items specific to a particular domain.

A domain may be an industry or group with a shared set of tasks, interests, language, and/or jargon. As a non-limiting example, restaurants as a group share the need to be able to accept an order for food from their menu. Menu items may have attributes such as the name of a dish, characteristics such as chicken dishes or Chinese cuisine, and calorie count. Restaurants also should be able to field queries about their menu from users. As another example, the event-ticket industry sells tickets that each have attributes such as the name of the event, a type of event (e.g. a concert, football game, movie, or the like), and a time, date, and location of the event. An automobile parts store may identify parts in its catalog by name, make/model/year of automobiles that can use specific parts, and brand. Different industries have different jargon as well. A transcript that includes "an o-ring for my patty" might be interpreted as ordering onion rings to go with a patty melt burger at a restaurant, but as requesting a rubber o-ring for a Cadillac® at an automobile parts store where "patty" is a word that is unlikely to be used and could be a speech recognition error of someone saying "caddy."

A specialist grammar for a particular domain of the catalog (e.g. the industry related to the catalog) is used. The specialist grammar defines certain words, phrases, and patterns of speech commonly used in that industry. The grammar may associate certain patterns with an intent of the user. For example, a patron at a restaurant may use a variety of different phrases to order an item, but that universe of "ordering phrases" is small and universal. It may include phrases such as "I would like" or "give me" or "we want to order" followed by an entrée name. In the ticket industry, the grammar for an order may include words such as "I need tickets for" or "we want to go to" or "get me into" for example. The grammar may include other types of intents, such as a request for information about an item, or a query for information filtered by an attribute such as "what chicken dishes do you have" for a restaurant or "what movies are playing tonight at my local theatre" for a ticket seller.

In some cases, a knowledge base may be used to associate additional attributes to an item. The knowledge base can be specific to the domain of the catalog or even specific to a subset of the domain (e.g. specific for Chinese restaurants). The knowledge base may include attributes that can be determined from the name of the item, such as the type of cuisine, ingredients, and/or possible substitutions. In some cases the knowledge base may include knowledge that is generic for the domain, such as providing a generic list of condiments as options to add to a sandwich (e.g. ketchup and mustard) which may not be specifically listed in the menu. The knowledge base may include substitution options for an item so that, for example, the system could receive an order for Pepsi® and suggest CocaCola® as an option if the menu does not include Pepsi as an item. In addition, the knowledge base may be updated with new information obtained from the catalog, such as new item names and/or categories.

In some cases, information from the catalog may be flagged for review by a human to validate that a particular attribute is appropriate for an item or to enter an attribute if the system is unable to determine what attribute(s) are appropriate. As a non-limiting example, a restaurant may have an item on the menu named "Chef's Special" with no description, making it impossible to determine its category or ingredients using information from the menu alone. As another example, if the system has not yet updated the knowledge base with information from a Vietnamese restaurant, the knowledge base may not know that a "banh mi" is a Vietnamese sandwich, so a menu item with that name may be flagged for human review. Once the human reviewer enters attributes for "banh mi," the knowledge base can be updated so that the next time a menu including "banh mi" is encountered, information from the knowledge base can be used to associate appropriate attributes to that item.

A code generation engine may be used to generate programming language code to interpret natural language input related to the catalog. The code generation engine utilizes the specialist grammar for the domain of the catalog and information obtained from the catalog, including names for the items listed in the catalog and attributes for those items, to generate the programming language code. The programming language code generated by the code generation engine can be any type of code targeted for execution by a computer, including machine language code directly executable by a processor, intermediate code (i.e. p-code) that can be translated to a particular machine code, or source code of a high-level language suitable for compilation into machine code by a compiler.

Other systems may utilize the programming language code generated to interpret natural language related to the catalog. For example, an interactive voice response (IVR) system receives audio containing speech from a user and generates an output based on what it decides is the intent of the user. The audio may be received from a microphone of a kiosk, over a telephone line, or through the internet. The IVR system can then use automatic speech recognition (ASR) to convert the speech into a transcript of natural language text. The IVR system can then use the programming language code generated based on the catalog and specialist grammar to determine the intent of the speaker. The IVR can then use the intent of the user to generate an appropriate output, such as to place an order or generate a voice response back to the speaker, such as answering a question asked by the user.

As another example, a chatbot may receive textual input from a user related to a catalog and generate a response. A chatbot can use the programming language code generated based on the catalog and specialist grammar to determine the intent of the user and then use the intent of the user to generate the response, such as to ask for clarification of the user's intent.

Reference now is made in detail to the examples illustrated in the accompanying drawings and discussed below.

FIG. 1 shows a block diagram of an embodiment of a system 100 to generate code 162 to interpret natural language related to a specific catalog 120. The system 100 includes a catalog of a plurality of items stored in a memory of the system. The system 100 can utilize any type of processing system, including one or more computers on a local area network or a cloud-based computing system. It may alternatively run on a single computer such as one corresponding to the block diagram of FIG. 4. The system 100 may include dedicated storage systems, such as network-attached storage (NAS) devices and/or storage area network (SAN) systems, in addition to local mass-storage devices (e.g. hard drives or solid-state drives) and local memory. Any of the storage devices or local memory may be referred to simply as memory herein.

The catalog 120 is specific to a particular domain. A domain may be an area of interest, an industry, a type of business, or a group of people or companies. The domain may share common tasks, interest, language, idioms, phrases, types of items, attributes for items, and/or particular jargon used in the domain. The catalog 120 includes names 122 for individual items of the plurality of items and may also include other information, including, but not limited to, attributes 124 for the items in the catalog and/or information about an entity that provided the catalog 120 (e.g. business name, location, hours of operation, and the like). The catalog 120 can be ingested into the system by any appropriate method. In some cases, the catalog 120 may be entered manually by a human into the system 100. In other cases, a paper copy of the catalog 120 may be scanned and processed by an optical character recognition (OCR) system to obtain its contents. An electronic data file may be provided to the system 100 in some cases where the data file contains textual information for the catalog 120. The textual information my be structured, such as but not limited to, a JavaScript Object Notation (JSON) or an eXtensible Markup Language (XML) document. In other cases, the textual information may be unstructured and the system 100 may process the data file to interpret its contents and determine the item names 122 and attributes 124 listed in the catalog 120.

In some implementations, the system 100 includes an interface 105 to another system, such as, but not limited to, a point-of-sale (POS) system 90, a manufacturing resource planning (MRP) system, or an inventory management system, to retrieve the catalog 120 of the plurality of items from the other system. If the interface is for a POS system 90, it can be any type or brand of system used to provide the items of the catalog 120, such as, but not limited to, systems from NCR, Block (formerly Square), Shopify, Toast, and TouchBistro. The interface 105 may use an application programming interface (API) of the POS system 90 to retrieve the catalog 120, and in some cases, other information about the business associated with the catalog 120, from the POS system 90. The interface 105 may be specific to a particular POS system 90 or may support more than one type of POS system 90, depending on the implementation.

The catalog 120 can include any items associated with its domain. While the domain can be any domain, examples herein are related to the restaurant industry, so the catalog 120 may also be referred to as a menu that lists food items served by a restaurant. The fact that the examples are related to the restaurant domain should not be seen as limiting on the claims, as catalogs 120 from other domains are envisioned, including, but not limited to, those already mentioned.

The system 100 also includes a specialist grammar 130, stored in the memory of the system 100. The specialist grammar 130 is specific to the particular domain of the catalog 120. The specialist grammar 130 can define an expected syntax of word usage to associate with the intent (i.e. semantics) for a set of words. The specialist grammar 130 can take any form that can be interpreted by the computer, including a set of logical statements, a graph or tree structure, or a formal grammar description language. Non-limiting examples of how the specialist grammar may be expressed include Speech Recognition Grammar Specification (SRGS) and/or Semantic Interpretation for Speech Recognition (SISR) from the World Wide Web Consortium (W3C), Java Speech Grammar Format (JSGF), Grammatical Framework (GF), or a grammar description language described in U.S. Pat. No. 10,957,310 issued on Mar. 23, 2021 and entitled "Integrated programming framework for speech and text understanding with meaning parsing" which is incorporated by reference herein for any and all purposes. The language described in that patent provides a syntax to include probabilities for a variety of next words in a phrase so that a phrase can be scored as to the likelihood of it representing a given pattern. This may take the form of an extended pattern table including one or more weighted alternative expressions that can represent the variations that might be used to express a particular phrase or intent.

In some implementations, the system 100 includes a knowledge base engine 140 to respectively associate one or more attributes to the individual items of the plurality of items and store the association between the respective individual items and their associated one or more attributes in the memory of the system. The knowledge base engine 140 may receive the item names 122 and attributes 124 that were obtained from the catalog 120 and also access a knowledge base 145 specific to the particular domain of the catalog for additional attributes related to the items in the catalog 120. The knowledge base 145 can take any usable form, including a database or a simple array of data, depending on the implementation, and may be stored in the memory of the system 100.

The knowledge base engine 140 determines relationships between the item names and their related attributes and uses that data to find additional information in the knowledge base 145 that may apply to the items in the catalog 120. That is, the knowledge base engine 140 is configured to use information from the knowledge base 145 to respectively associate the one or more attributes to the individual items of the plurality of items.

As a non-limiting example, a menu 120 may list a club sandwich without further explanation. The knowledge base 145 may include an entry for a club sandwich that has been previously entered from another menu and has additional information about that item, such as, but not limited to, an ingredient list (bread, bacon, turkey, cheese), an alternate name (clubhouse sandwich), a suggested substitution (turkey sandwich), and a cuisine (American). Those attributes can then be associated with the club sandwich listed on the menu 120. If the menu 120 includes additional items and/or attributes which have not yet been included into the knowledge base 145, the knowledge base engine 140 can update the knowledge base 145 with the new information. In some cases, the knowledge base 145 may not have an entry for a particular item and the knowledge base engine 140 may flag the item for review by a human. When the human provides additional data for the item to the knowledge base engine 140, the new information (e.g. an attribute for the item) may be associated with the item from the menu 120 and/or used to update the knowledge base 145.

The human may also enter additional data, such as defining that, for that domain, a particular word may have a synonym. As an example, a dish called "flaming chicken" may be tagged for human review. The human may then indicate that "flaming" is a synonym for "spicy" and next time a menu item used that term, for example "flaming wings" is encountered, it will be tagged with "spicy food."

The system also includes a code-generation engine 160 to generate programming language code 162 to interpret natural language input related to the catalog 120. The code-generation engine 160 uses the specialist grammar 130 and the names 122 for the individual items of the plurality of items and their associated one or more attributes 124 to build a customized interpreter for natural language related to the catalog 120. In some implementations, the system may ingest other information about a business associated with the catalog 120 and stored the information in the memory of the system. The code-generation engine 160 can then use the information about the business in the generation of the programming language code 162. Examples of other information may include, but are not limited to, a location, hours of operation, a phone number, and/or a web page. The programming language code 162 can be generated at any level, depending on the implementation, including source code suitable for compilation by a compiler into machine code, an intermediate code, sometimes called p-code, which can be interpreted at run-time or later compiled into machine code, or machine code executable by a processor. In at least some implementations, the programming language code 162 and the specialist grammar 130 are expressed in the same language. The programming language code 162 can then be stored in storage 190 that may be accessible to other systems.

Figure 2:
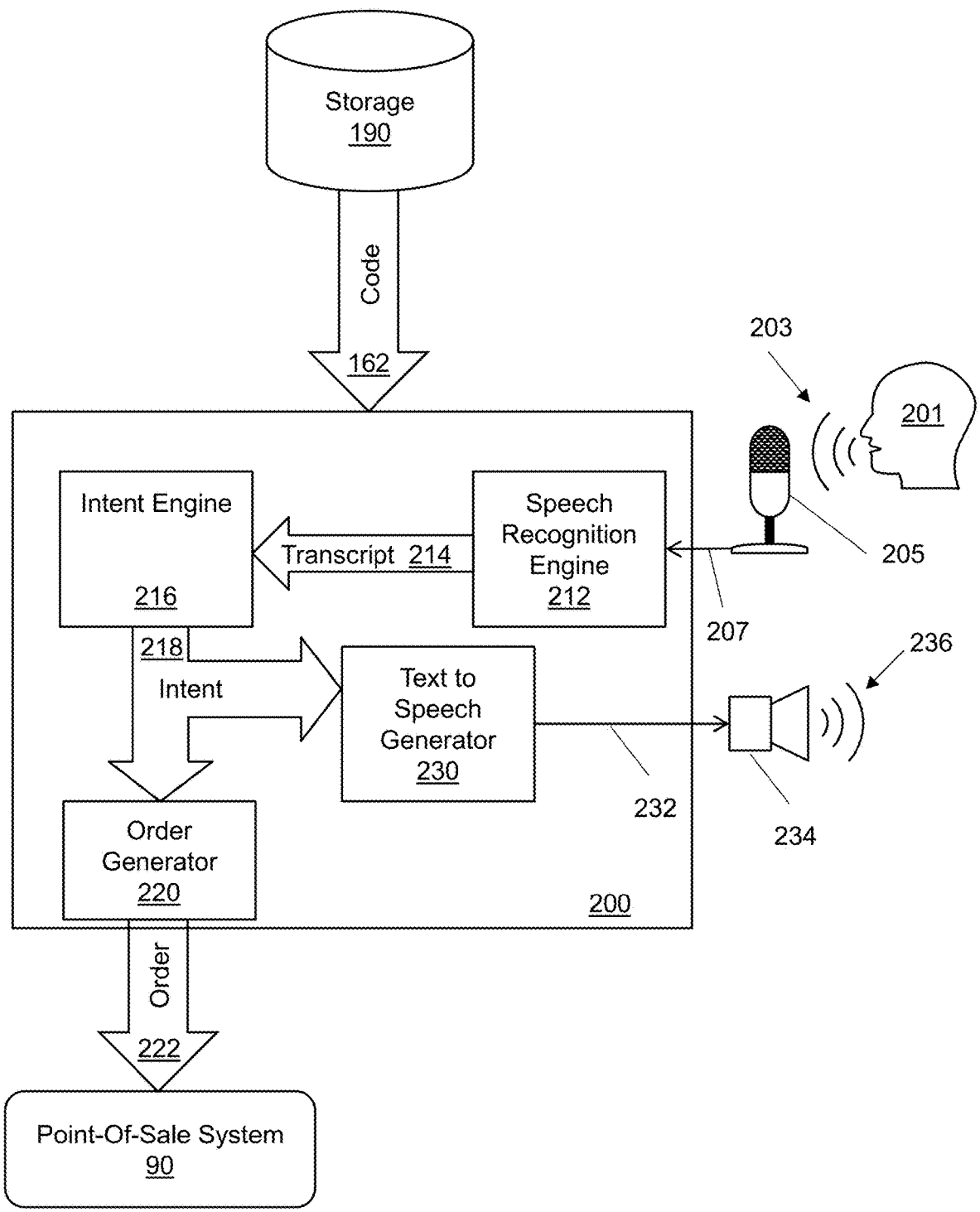
FIG. 2 shows a block diagram of an embodiment of a system to generate an order from a catalog from a speech input.

FIG. 2 shows a block diagram of an embodiment of a system 200 to generate an order 222 from a catalog from a speech input 203 contained in audio 207 provided by a user 201. The system 200 includes an audio receiver 205. The audio receiver 205 may include a microphone to directly receive soundwaves including speech 203 which then may be used to generate a digital version of the audio 207, or the audio receiver 205 may be an interface to another system, such as a voice over internet protocol (VOIP) system or web server, to receive digital audio streams or audio files as the audio 207 containing the speech 203.

The system 200 also includes a speech recognition engine 212 configured to perform speech recognition on the audio 207 received by the audio receiver 205 and to generate a transcript 214 for the speech 203 contained in the audio 207. The speech recognition engine 212 may use any speech recognition technique but implementations may use the speech recognition engine 300 shown in FIG. 3. Thus, the speech recognition engine 212 may be configured to use the programming language code 162 to improve an accuracy of the transcript 214 as is described below.

The system 200 also includes an intent engine 216 which ingests the transcript 214 and uses the programming language code 162, retrieved from storage 190, with the transcript 214 to generate an intent 218 of the speech. The programming language code 162 may generate scores for various intents from the transcript 214 and pick the intent most likely to be represented by the transcript 214. The intent 218 can be an intent related to the domain of the catalog 120 and represented by the specialist grammar 130 used to generate the programming language code 162 or other more general intents that may be incorporated into the intent engine 216. Examples of intents for the restaurant domain may include, but are not limited to, an order of one or more food items, the addition of an option (e.g. a condiment) to the food item, a query about a food item (e.g. the price or ingredients), or providing a payment method for the order.

The system 200 may include a text to speech generator to handle some intents 218 to generate a speech response 232 that may be played back through a speaker 234 as sound 236 for the user 201. The content of the speech response 232 may be incorporated into the intent 218 generated by the intent engine 216 and may be provided by the programming language code 162 based on the catalog 120, the knowledge base 145, and/or the other information 95 used to generate the programming language code 162. Thus, the text-to-speech generator 230 may generate a speech response 232 based on the intent 218.

The system 200 may also include an order generator 220 to create an order 220 for one or more items of the plurality of items based on the intent 218. The order generator 220 may interface to a POS system 90 by using APIs for that system 90. In some cases, the order generator 220 may also provide payment information, extracted from the speech 203 and into the intent 218 by the intent engine, to the POS system 90.

While FIG. 2 shows the use of the programming language code 162 in a system with audio input and output, other systems may receive text input from the user 201 so that the user directly provides the transcript 214, and/or textual output displayed on for the user 201 to read, bypassing the text-to-speech converter 230. Applications such as a chatbot which interacts with the user over the internet or using Short Message Service (SMS) messages with a cellphone may be effective using textual input and/or output. A kiosk in a noisy environment is another example of a system where textual input and/or output may be desirable. Some systems may provide both audio and textual interfaces, so that a user can decide whether to speak or to input text and/or may display the text and perform the text-to-speech conversion. In yet other systems, a user may be provided with a choice (or may have a pre-set preference) to set a preferred input mode (text or speech) and/or preferred output mode.

Figure 3:
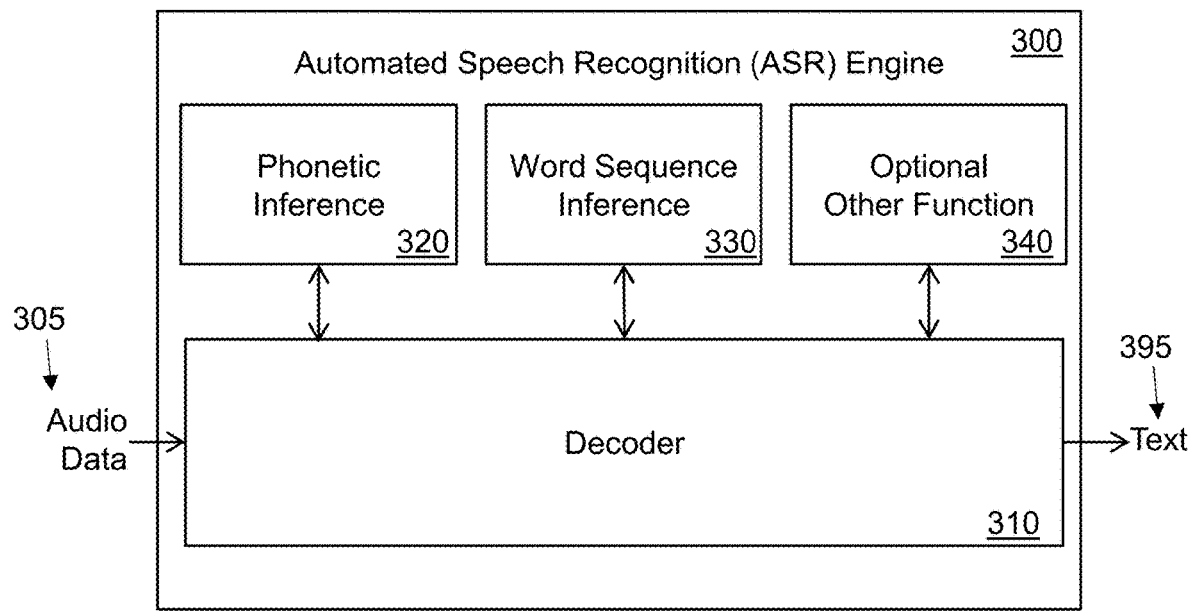
FIG. 3 shows a block diagram of an embodiment of a speech recognition engine.

FIG. 3 shows a block diagram of an embodiment of an automatic speech recognition (ASR) engine 300. The ASR engine 300 may also be referred to as a speech-to-text converter. The ASR engine 300 may be used in an implementation of the system 200 as the speech recognition engine 212. The ASR engine 300 includes a decoder 310 which receives the audio data 305 and may process that data 305 in any way, depending on the embodiment. The decoder 310 generates text 395 from the audio data 305 using phonetic inference 320, word sequence inference 330, and optionally other function(s) 340.

The decoder 310 may filter the audio data 305 (which may be an optional other function 340) to remove noise, perform equalization, or add pre-emphasis to the audio data 305, depending on the embodiment. In some embodiments, the decoder 310 may split the audio data 305, which may be a stream of data being received in real-time, into frames of a preset length. Any length may be used, depending on the embodiment, but in some embodiments, a frame may contain 10 ms of audio data. The decoder 310 may then operate on each incoming frame of data or may skip some frames, depending on the embodiment. Different decoders 310 may also execute at different time intervals, depending on the embodiment.

The decoder 310 may then perform additional signal processing on a frame of audio data to extract features from the frame of audio data. The processing can take any form but may include applying a discrete Fourier transform (DFT) to the frame to generate a spectrogram for the frame. Any type of DFT may be used including a fast Fourier transform (FFT). The spectrogram may be further processed to extract features to be sent to the acoustic model for phonetic inference 320. Any number of features may be extracted for each processed frame but may typically be in the range of 20-50 features. Any type of processing of the spectrogram may be used to generate the features, including simple histogram analysis of the spectrogram, but in some embodiments, mel frequency analysis and cepstral analysis may be used to extract the features from the full spectrogram. Mel frequency analysis and cepstral analysis together may be used to extract mel frequency cepstral coefficients (MFCC) which may be used as at least some of the features for the frame. Some embodiments may also generate MFCC deltas (based on changes in frequencies) and/or MFCC delta-deltas (changes in changes in frequencies) in addition to (or instead of) MFCCs as the features for the frame. Different ASR engines may use different decoders that have different functionality, such as, but not limited to, different frame sizes, different frame skipping algorithms, different DFT implementations, and/or extraction of different features.

The decoder 310 can then provide the extracted features for a frame to an acoustic model to perform phonetic inference 320 which generates phonemes (or senones) from the features. In some embodiments, an acoustic model may be a hidden Markov model but may alternatively be a neural network (NN). In some cases, an acoustic model NN may include convolutional layers that learn features across frequencies in a spectrogram, long short-term memory (LSTM) recurrent layers that learn features across captured audio frames, fully connected layers, other types of layers, or any combination thereof. Different acoustic models used in different ASR engines may utilize any known mechanism to perform the phonetic inference 320 function with different performance levels and different computational requirements.

The decoder 310 may provide the phonemes (or senones) inferred by the acoustic model to a statistical language model to perform word sequence inference 330. A statistical language model may be implemented as an n-gram model which provides the probability of a word sequence being spoken. The size and complexity of an n-gram language model is driven primarily by the vocabulary size and depth of n-gram (i.e. the length of the sequence of words used to predict the next word). In some embodiments, the search beam width or top-n heap size may vary between statistical language models to vary the performance/capacity tradeoff.

A statistical language model may also be implemented, at least in part, using an NN. A statistical language model NN may utilize an encoder-decoder technique such as a transformer neural network. A further enhancement of the encoder-decoder technique that may be used in some embodiments of a statistical language model is the bidirectional encoder representations from transformers (BERT) which uses a masked language model to remove the unidirectionality constraint of the transformer neural network. Different statistical language models used in different ASR engines may utilize any known mechanism to perform the word sequence inference 330 function with different performance levels and different computational requirements.

The ASR engine 300 may optionally include an additional function 340. The additional function 340 may include a neural language model (NLM) rescoring step that runs after candidate transcripts have been generated for the audio data 305, which may be a compute intensive process. NLM rescoring may cause a more "linguistically correct" hypothesis to be selected from the candidate transcripts. Another additional function 340 that some ASR engines may include is a noise removal filter or resampling function to change the sample rate of the input audio before it is processed which may have an impact on the overall computing resource requirements of the ASR engine. Different ASR engines may include any number (including 0) of additional functions 340 beyond the decoder 310, the phonetic inference 320, and the word sequence inference 330 functions. So a first ASR engine may include a function that is not included in a second ASR engine.

In some implementations, the other function 340 may use the computer program code 162 to rescore candidate transcripts generated by the decoder 310 to more accurately predict the proper transcription of the audio data 305 given a context of the speech being related to the catalog 120. So, for example a user may be trying to ask "what kind of teas to you have" but due to a lisp, it may sound more like "what kind of teeth do you have." By using the programming language code 162 to rescore the candidate transcripts, the ASR engine 300 may be able to accurately generate "teas" due to the code 162 being generated using the menu listing "teas" but not "teeth."

Figure 4:
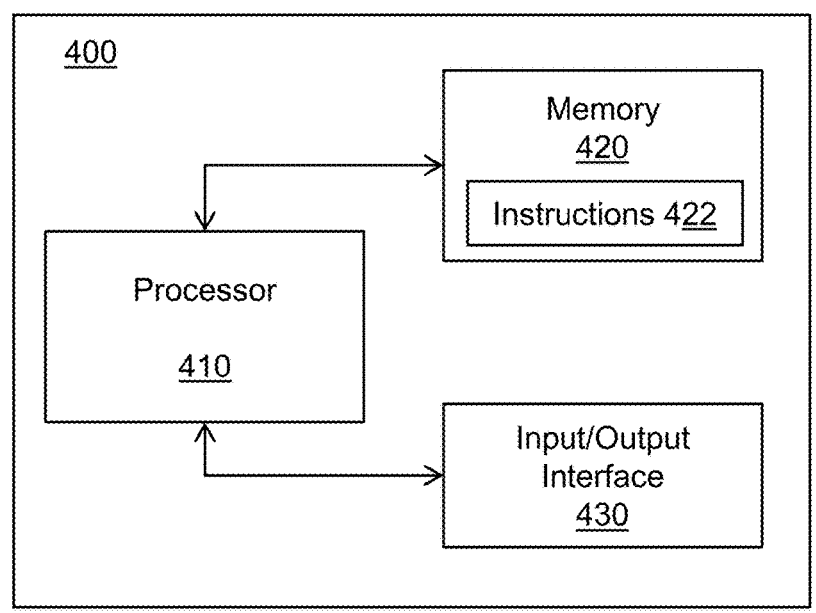
FIG. 4 is a block diagram of a computer system suitable for use in embodiments.

FIG. 4 is a block diagram of a computer system 400 suitable for use in the system 100 and/or system 200. The system 400 may be referred to as a server or a cloud computing resource. The computer system 400 includes a processor 410 coupled to memory 420. Any suitable processor 410 may be used including, but not limited to an X86 architecture processor, an ARM® core processor, or a GPU. The processor 410 may include multiple cores on a single die and/or multiple processor dice in a multi-processor arrangement. The memory 420 may include one or more physical devices of any type of computer-readable storage, including, but not limited to, any type of semiconductor-based dynamic random access memory (DRAM), non-volatile semiconductor memory such as flash memory, and rotating media magnetic storage (e.g. hard drives).

The memory 420 includes instructions 422 that when executed by the processor 410 can perform any method described herein. Specifically, the instructions 422 can configure the processor 410 to generate computer programming language code to interpret a transcript related to a catalog.

The system 400 also includes one or more input/output (I/O) interfaces 430. Any type of interface may be included in the one or more I/O interfaces including a network interface, a display interface, an audio input, an audio output, and/or an interface for a human input device. The I/O interfaces 430 may be used for a variety of purposes, including, but not limited to, communicating with a POS system, displaying status information, receiving audio input, sending speech output, and/or receiving updated information for the knowledge base from a human.

Figure 5:
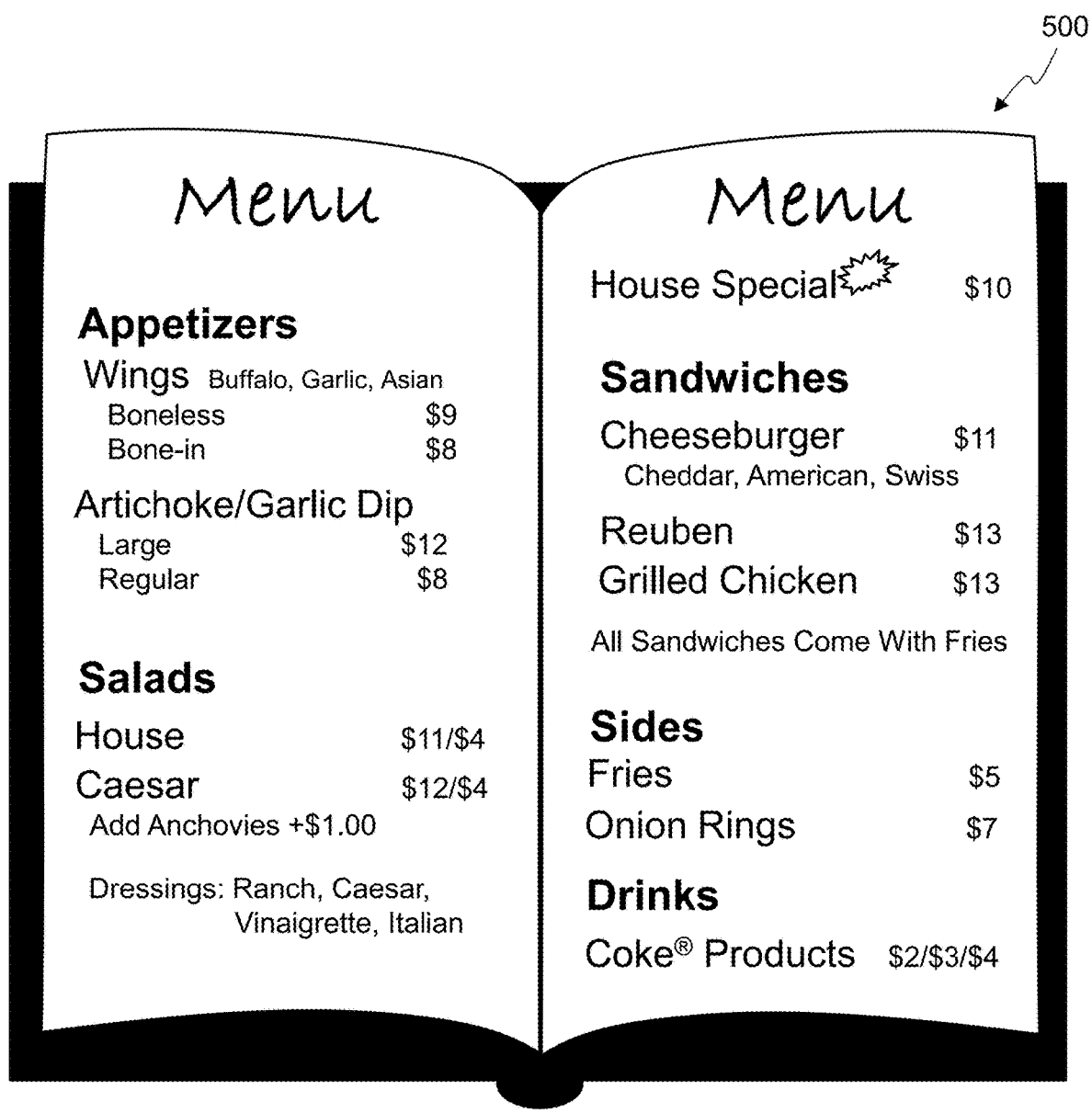
FIG. 5 shows an example menu from a restaurant.

FIG. 5 shows an example menu 500 from a restaurant. The menu 500 is a catalog for the domain of the restaurant industry. The example menu 500 represents a physical menu that might be used by a patron of the restaurant, but the menu used by the system 100 will be in computer-readable form. The menu may be scanned and processed using an OCR engine to generate unstructured text which is then processed to understand its context. Or a version of the menu may be provided in computer readable form by the POS system 90 or by the restaurant itself. The menu 500 includes several sections, Appetizers, Salads, Sandwiches, Sides, and Drinks, although other menus can have any number and type of sections. Other catalogs from other domains may have very different sections or no sections at all. The sections of the menu 500 help provide attributes for the plurality of items listed in that section. Table 1 below represents a structured text format (i.e. an array) representing the information found in the menu 500.

TABLE 1

| Name | Members | Price | Options | Option Prices |
|---|---|---|---|---|
| Appetizer | Artichoke/Garlic Dip | | | |
| | Boneless Wings | | | |
| | Bone-in Wings | | | |
| | Wings | | | |
| Artichoke/Garlic Dip | | $ 8 | Large | $4 |
| Bone-in Wings | | $ 8 | Asian | $0 |
| | | | Buffalo | $0 |
| | | | Garlic | $0 |
| Boneless Wings | | $ 9 | Asian | $0 |
| | | | Buffalo | $0 |
| | | | Garlic | $0 |
| Caesar | | $ 4 | Anchovies | $1 |
| | | | Caesar | $0 |
| | | | Italian | $0 |
| | | | Large | $4 |
| | | | Ranch | $0 |
| | | | Vinaigrette | $0 |
| Cheeseburger | | $11 | Cheddar | $0 |
| | | | American | $0 |
| | | | Swiss | $0 |

TABLE 1-continued

| Name | Members | Price | Options | Option Prices |
|---|---|---|---|---|
| Coke Products | | $ 2 | Large | $2 |
| | | | Medium | $1 |
| | | | Small | $0 |
| Drinks | Coke Products | | | |
| Fries | | $ 5 | | |
| Grilled Chicken Sandwich | | $13 | | |
| House Special | | $10 | | |
| House (Salad) | | $ 4 | Caesar | $0 |
| | | | Italian | $0 |
| | | | Large | $4 |
| | | | Ranch | $0 |
| | | | Vinaigrette | $0 |
| Onion Rings | | $ 7 | | |
| Reuben | | $13 | | |
| Salads | Caesar | | | |
| | House | | | |
| Sandwiches | Cheeseburger | | | |
| | Grilled Chicken | | | |
| | Reuben | | | |
| Sides | Fries | | | |
| | Onion Rings | | | |
| Wings | Boneless Wings | | | |
| | Bone-in Wings | | | |

The system 100 can ingest the menu (i.e. catalog) of the plurality of items, including names of the items which are shown in the "Name" column and one or more attributes for the items as shown in the remaining columns of Table 1. The system then respectively associates the one or more attributes to the individual items of the plurality of items as shown on individual rows of Table 1. In some cases the attributes indicate a characteristic of the item which is unchangeable, such as the price of the base item. In some cases, the attributes include a modifiable characteristic for an individual item, such as the options attribute. So for example Coke Products have a base price of $2 and three options, small which adds no cost, medium which adds $1 to the cost, and large which adds $2 to the cost. Note that the programming language code generated from the menu may include the modifiable characteristic for the individual item.

The menu may be processed by a knowledge base engine using a knowledge base to provide additional attributes for the menu items. Table 2 below shows an example knowledge base for the restaurant industry.

TABLE 2

| Name | Members | Main Ingredients | Substitutions | Options |
|---|---|---|---|---|
| Appetizer | Nachos | | | |
| | Wings | | | |
| Beef | Cheeseburger | | | |
| | Hamburger | | | |
| | Steak | | | |
| Burger | Cheeseburger | | | |
| | Hamburger | | | |
| Cheeseburger | | Beef | Hamburger | Ketchup |
| | | | | Lettuce |
| | | | | Mayo |
| | | | | Mustard |
| | | | | Pickle |
| Chicken | Crispy Chicken Sandwich | | | |
| | Grilled Chicken Sandwich | | | |
| | Fried Chicken | | | |
| | Wings | | | |
| Coke Products | Coca-Cola | | | |
| | Diet Coke | | | |
| | Coke Zero | | | |
| | Sprite | | | |
| Cola | Coca-Cola | | | |
| | Pepsi | | | |
| Condiments | Mayo | | | |
| | Lettuce | | | |
| | Pickle | | | |
| | Ketchup | | | |
| | Mustard | | | |

TABLE 2-continued

| Name | Members | Main Ingredients | Substitutions | Options |
|---|---|---|---|---|
| Crisply Chicken Sandwich | | Chicken | Grilled Chicken Sandwich | Ketchup Lettuce Mayo Mustard Pickle |
| Diet Cola | Diet Coke Coke Zero Diet Pepsi | | | |
| Fried Chicken | | Chicken | Wings | |
| Grilled Chicken Sandwich | | Chicken | Crisply Chicken Sandwich | Ketchup Lettuce Mayo Mustard Pickle |
| Hamburger | | Beef | Cheeseburger | Ketchup Lettuce Mayo Mustard Pickle |
| Ketchup | | | | |
| Lettuce | | | | |
| Mayo | | | | |
| Mustard | | | | |
| Pepsi Products | Diet Pepsi Mountain Dew Pepsi | | | |
| Pickle | | | | |
| Salad | | Lettuce | | |
| Sandwich | Cheeseburger Crispy Chicken Sandwich Hamburger Grilled Chicken Sandwich | | | |
| Steak | | Beef | | Medium Medium-Rare Medium Well Rare Well Done |
| Wings | | | Fried Chicken | |

Note that the knowledge base, as shown in the example of Table 2, may not have the same categories of attributes as the menu even though the knowledge base of Table 2 is specific to the particular domain of the catalog (i.e. menu), that is the restaurant industry. In the example shown, the knowledge base includes "Main Ingredients" and "Substitutions" that are not found in the menu 500. Also note that the menu 500 has restaurant specific information, such as pricing that may not make sense to include in a knowledge base as that information would not be applicable to another restaurant.

The knowledge base engine can use the knowledge base for at least some of the associating the one or more attributes to individual items of the plurality of items. So for example, the menu lists Coke Products but doesn't provide specific types of drinks. The knowledge base includes an item called Coke products that lists Coca-Cola, Diet Coke, Coke Zero, and Sprite as members, so the knowledge base engine can add those as attributes for Coke Products. As another example, the menu does not list standard condiments as most patrons of the restaurant understand that the restaurant will have ketchup, mustard, and pickles available. The knowledge base provides that information, showing that a cheeseburger at most restaurants can have ketchup, lettuce, mayo, mustard, and/or pickle added, so that can be included for the cheeseburger on the menu as an attribute (or a modifiable characteristic). In addition, the knowledge base indicates that the main ingredient of a cheeseburger is beef and that a hamburger may be a substitute, so both those may also be added as attributes for the cheeseburger on the menu.

In addition, the knowledge base engine may update the knowledge base based on the catalog. Note that the knowledge base only includes information that a salad is an item that has lettuce as its main ingredient. The knowledge base engine can take the information from the menu about House Salad and Caesar Salad to update the knowledge base so that it can include those items and information about the different dressings that can be selected as options. Thus, the knowledge base engine can use the menu to update the knowledge base to add new items.

The knowledge base engine may find items in the menu where more information would be useful. For example, the menu lists a House Special, but neither the menu itself nor the knowledge base provide any additional information beyond the price. Similarly, the Reuben is listed as a sandwich, but the knowledge base does not provide any information, such as its main ingredient. The knowledge base engine may flag these items because they are unmatched in the knowledge base. A human being may later provide additional information about the items that can be used to associate an attribute with the item, such as that the House Special for this restaurant is a prime rib sandwich and the Rueben has a main ingredient of corned beef. The additional information may further indicate whether it should be added to the knowledge base, so for example, the information about the Reuben could be used to update the knowledge base but the information about the House Special might not be appropriate to add to the knowledge base as other restaurants may have a completely different House Special.

Figure 6:
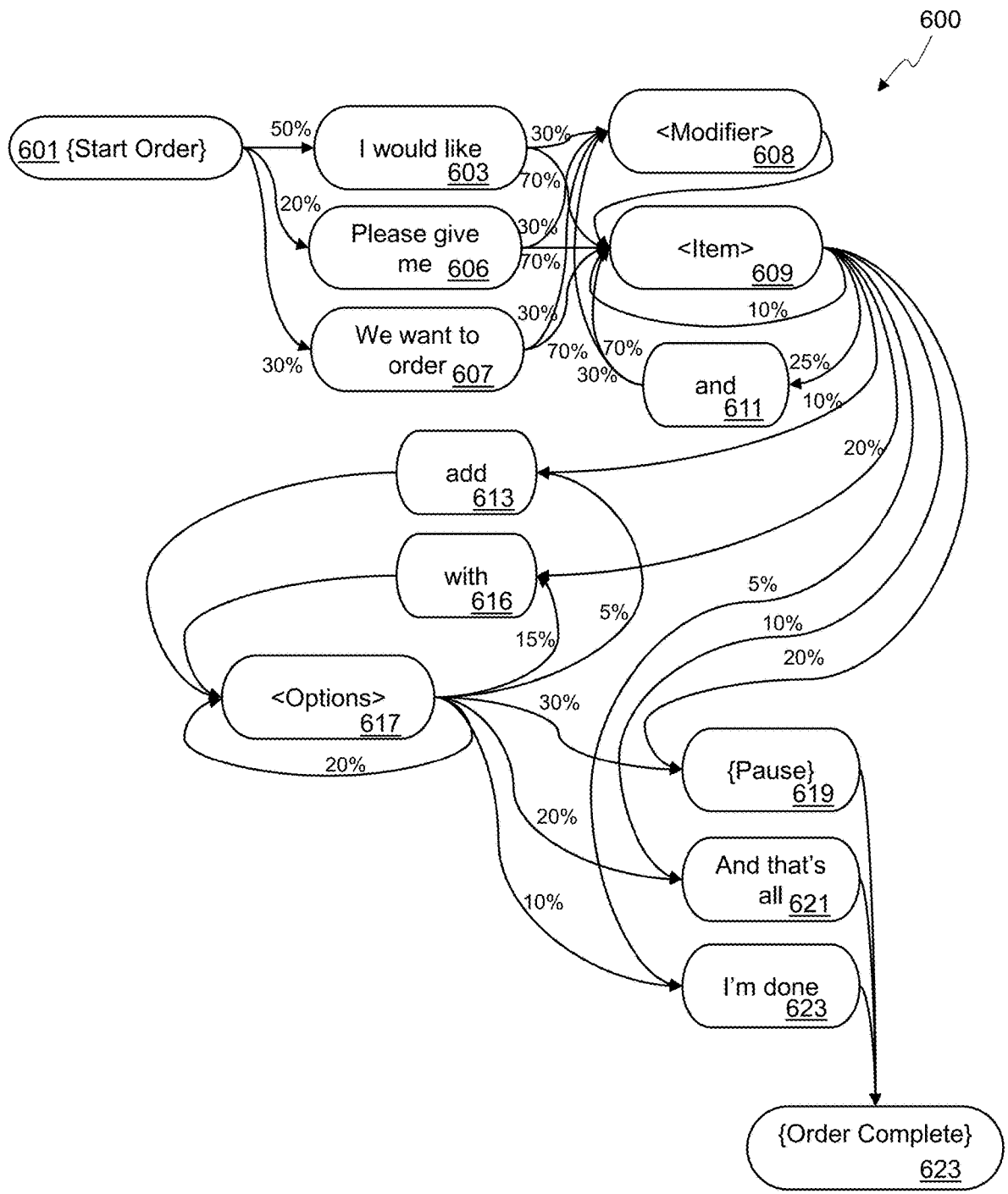
FIG. 6 is a diagram of an example specialist grammar specific to the restaurant domain.

FIG. 6 is a diagram of an example specialist grammar 600 specific to the restaurant domain. The specialist grammar 600 is shown in a human readable form but any computer-readable format of a specialist grammar can be used for implementations. The specialist grammar 600 describes a grammar to create an order for items listed on a menu of the restaurant domain. The specialist grammar 600 may be useable for many different restaurants. The specialist grammar 600 defined that to start an order 601, one of three phrases may be used. It defines that there is a 50% chance of starting an order with "I would like" 603, a 20% chance of starting an order with "Please give me" 606, and a 30% chance of starting an order with "We want to order" 607. Note that the example shown is highly simplified for clarity of the example. A true specialist grammar 600 for ordering from a menu would have many additional possible initiating phrases. In some cases, an order may be initiated as a part of an interactive voice response system where a speech-based prompt could be played to the user which would create a different start to an order than shown in FIG. 6.

Once it has been determined that an order has been started, the grammar shows that the next utterance is expected to be either for an item name 609 or a modifier 608. There may be an 70% chance that the item name 609 will be provide and a 30% chance that a modifier 608 will be the next utterance followed by the item name 609. The grammar 600 is meant to be used with a menu (i.e. a catalog for the restaurant industry domain) and the list of item names may be taken from the menu. Once an item name has been received, there are 7 different branches that can be taken in the grammar 600 with associated probabilities that add up to 100%. The grammar defines that there is a 10% chance that another item name 609 may directly follow and a 25% chance that the user will say "and" 611 followed by another item name 609.

The grammar also defines two different paths by which a user may add an option to the item with a 10% chance of the user saying "add" 613 and a 20% chance of the user saying "with" 616 followed by the option 617. The option may be based on an attribute associated with the item and may have been taken from the menu itself or from a knowledge base. After listing the option 617, the grammar 600 indicates that there is a 20% chance of the user simply listing another option 617, a 15% chance of the user saying "with" 616 followed by another option 617, and a 5% chance of the user saying "add" 613 followed by another option 617.

There are several paths to end the order shown by the grammar 600. In some cases the order may end after ordering an item 609 with a 20% chance of a long pause indicating the end of the order, a 10% chance of the user saying "and that's all" 621, and a 5% chance of the user saying "I'm done" 623. After adding an option 617, the grammar defines a 30% chance of a pause 619, a 20% chance of "and that's all" 621 and a 10% chance of "I'm done" 623 to complete the order 623.

In some implementations, a specialist grammar may be expressed, at least in part, as a set of extended pattern tables that declaratively express weighted alternative expressions of a particular ambiguously expressed element." This is described in U.S. Pat. No. 10,957,310 issued on Mar. 23, 2021 and entitled "Integrated programming framework for speech and text understanding with meaning parsing."

However the grammar is expressed, it can be used to score a natural language phrase against an intent described by that grammar. The score can then be used to determine what the intent of the natural language phrase really is or to determine that the intent of the phrase is unknown, and more information is needed.

For some transcripts, there may be multiple possible parses (i.e. paths) through the specialist graph. For example, if the transcript is "I would like a spicy chicken sandwich" and the item list includes both "chicken sandwich" and "spicy chicken sandwich" and the modifier list include "spicy," then there are two paths through the specialist graph 600. One of the paths orders the "spicy chicken sandwich," with a score of 50%*70%*20%=7%, and the other orders a "chicken sandwich" with a modifier of "spicy," with a weight of 50%*30%*20%=3%, which instructs the restaurant to add a spicy condiment to the chicken sandwich. In some implementations, the parse with highest score, an order for a "spicy chicken sandwich," may be assumed to be the proper intent of the transcript.

But in other implementations, each possible parse is scored and passed to a determination module that looks at each parse's fulfillment outcome. The determination module may use heuristics to select the parse that delivers the most desirable outcome. The "fulfillment outcome" may be a collection of factors, including any number of intents that are unfulfillable due to contradicting a restaurant's specific menu structure.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions or by configuration information for a field-programmable gate array (FPGA). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Similarly, the configuration information for the FPGA may be provided to the FPGA and configure the FPGA to produce a machine which creates means for implementing the functions/acts specified in the flowchart and/or block diagram block or blocks.

These computer program instructions or FPGA configuration information may be stored in a computer readable medium that can direct a computer, other programmable data processing apparatus, FPGA, or other devices to function in a particular manner, such that the data stored in the computer readable medium produce an article of manufacture including instructions which implement the function/act specified in the flowchart and/or block diagram block or blocks. The computer program instructions or FPGA configuration information may also be loaded onto a computer, FPGA, other programmable data processing apparatus, or other devices to cause a series of operational steps to be performed on the computer, FPGA, other programmable apparatus, or other devices to produce a computer implemented process for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code comprising one or more executable instructions, or a block of circuitry, for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
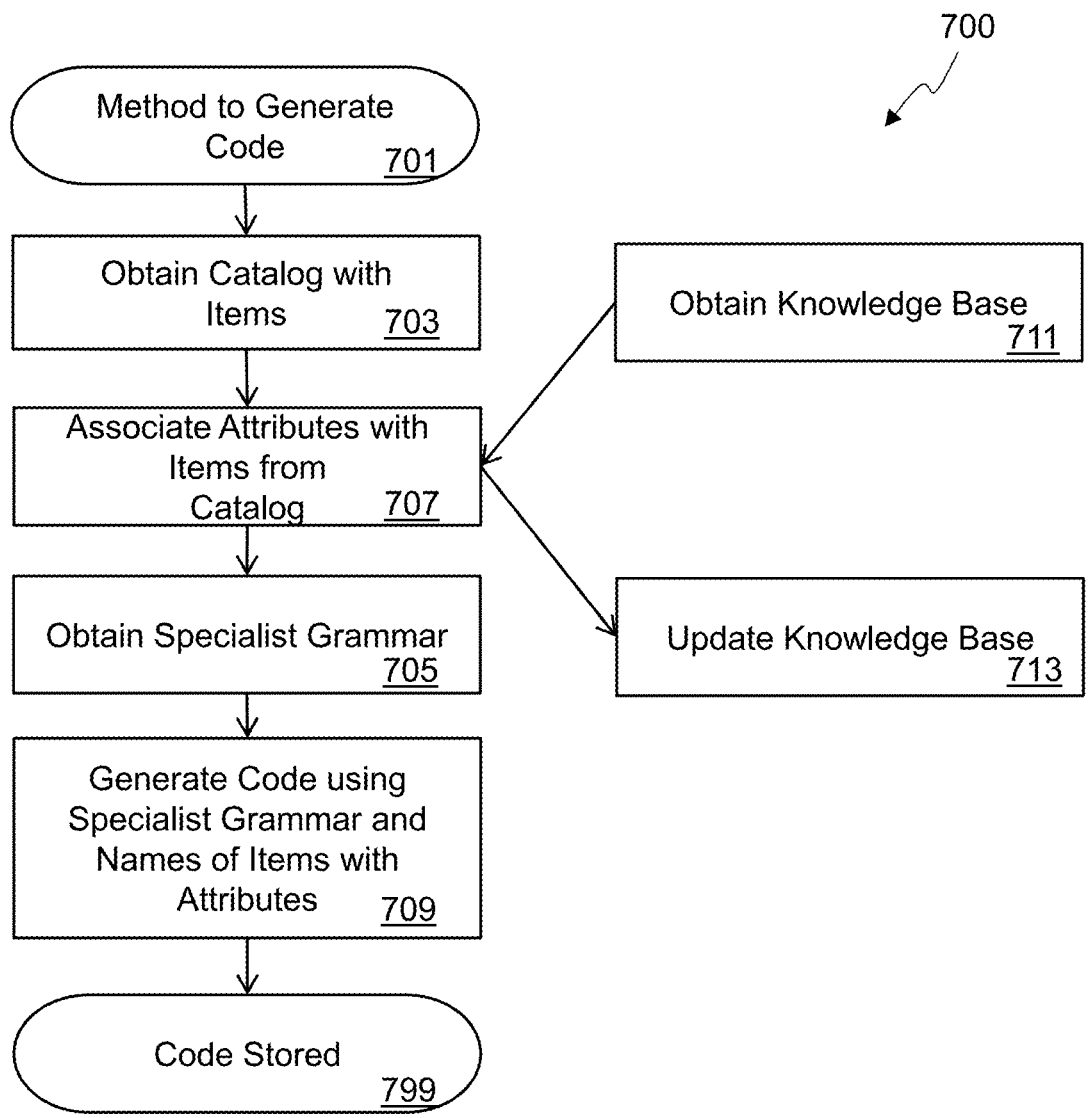
FIG. 7 is a flowchart of an embodiment of a method to generate code to interpret natural language related to a specific catalog.

FIG. 7 is a flowchart 700 of an embodiment of a method to generate code to interpret natural language related to a specific catalog. The method starts 701 and obtains 703 a catalog of a plurality of items, the catalog being specific to a particular domain and including names for individual items of the plurality of items. The catalog of the plurality of items may, in some cases, be received from a point-of-sale system. One example where the method may be useful is where the particular domain of the catalog is the restaurant industry, the catalog comprises a menu for a restaurant, and the plurality of items comprises food items served by the restaurant. The catalog may include the one or more attributes for an individual item of the plurality of items. An attribute may include a modifiable characteristic for an individual item, such as a size of the item or an optional add-in, such as a condiment.

The method also includes respectively associating 707 one or more attributes to the individual items of the plurality of items. The associating may be performed by a knowledge base engine or by any other part of a system implementing the method. The attributes may be obtained from any source and by any method, including from the catalog, from a knowledge base, from an internet search, or from a human being. So in some implementations, the method may include obtaining 711 a knowledge base specific to the particular domain of the catalog and using the knowledge base for at least some of the associating of the one or more attributes to individual items of the plurality of items. In addition to using the knowledge base to associate attributes to item of the catalog, the information obtained from the catalog may be used to update 713 the knowledge base. In some cases, an item from the catalog may not be found in the knowledge base. So, the method may include flagging an item of the plurality of items that is unmatched in the knowledge base and then later receiving an attribute to associate with the flagged item. The attribute can again come from any source, but in some implementations, a human being may be notified of the flagged item and given the task to provide attributes for the flagged item. Once the attribute has been received for the flagged item, the knowledge base may be updated to include the flagged item associated with the received attribute.

The method continues with obtaining 705 a specialist grammar specific to the particular domain of the catalog. The specialist grammar can take any form, but it may, in some implementations, include an extended pattern table including one or more weighted alternative expressions. The specialist grammar can provide a way of associating an intent with one or more ways of expressing that intent by someone from the particular domain.

Programming language code is generated 709 to interpret natural language input related to the catalog using the specialist grammar, and the names for the individual items of the plurality of items and their associated one or more attributes. The programming language code 709 is then stored 799. In some implementations other information about the business is also used in the generation of the programming language code. The programming language code can be any type of code that can be used to generate instructions for a processor, including source code suitable for compilation by a compiler into machine code or machine code directly executable by a processor. In some implementations, the specialist grammar and the programming language code may use the same language.

Figure 8:
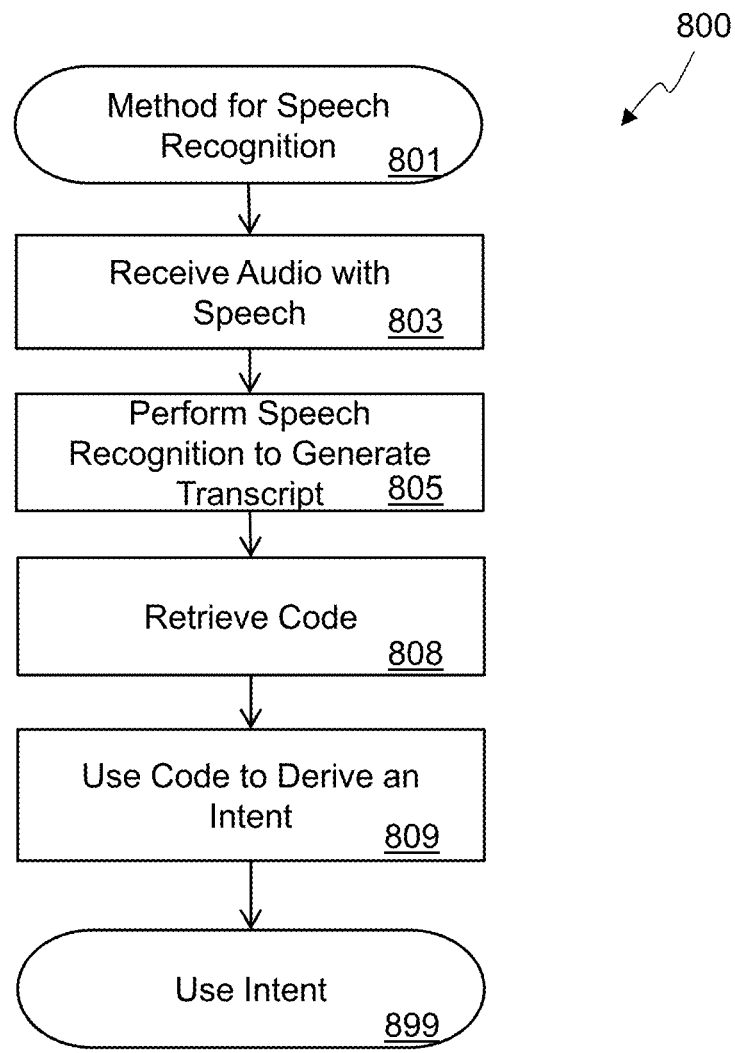
FIG. 8 is a flowchart of an embodiment of a method to generate an intent from received speech using the programming language code generated by the flowchart of FIG. 7.

FIG. 8 is a flowchart 800 of an embodiment of a method to generate an intent from received speech using the programming language code generated by the flowchart of FIG. 7. The speech recognition starts 801 with receiving 803 audio that includes speech related to a catalog and performing 805 automatic speech recognition on the audio to generate a transcript.

The programming language code that was generated for the catalog is retrieved 808. In some implementations, the programming language code may be provided to a speech-to-text converter that can use it as a part of the automatic speech recognition to improve an accuracy of the natural language transcript. This may be done by generating multiple partial transcripts and then using the programming language code to rescore the transcripts to help determine which of the alternative transcripts is most likely to be accurate for the speech related to the catalog. The programming language code is then used to process the transcript to derive 809 an intent of the speech. The intent can be used 899 in several different ways, depending on the intent. The method may include generating an order for one or more items of the plurality of items based on the intent. The method may also, or alternatively, include generating a response based on the intent.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "server," "circuitry," "module," "client," "computer," "logic," "FPGA," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for an FPGA or other programmable logic as well as traditional binary computer instructions, and the term "processor" explicitly includes logic in an FPGA or other programmable logic configured by the configuration information in addition to a traditional processing core such as one in a central processing unit (CPU) or graphics processing unit (GPU). Furthermore, "executed" instructions explicitly includes electronic circuitry of an FPGA or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. In addition, the computer program code may be written in Verilog, VHDL or another hardware description language to generate configuration instructions for an FPGA or other programmable logic. The computer program code, if converted into an executable form and loaded onto a computer, FPGA, or other programmable apparatus, produces a computer implemented method. The instructions which execute on the computer, FPGA, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium is comprised by an article of manufacture.

Various examples are described in the following paragraphs:

Example 1. A computer-implemented method comprising: ingesting a catalog of a plurality of items, the catalog being specific to a particular domain and including names for individual items of the plurality of items; respectively associating one or more attributes to the individual items of the plurality of items; obtaining a specialist grammar specific to the particular domain of the catalog; generating programming language code to interpret natural language input related to the catalog using the specialist grammar, and the names for the individual items of the plurality of items and their associated one or more attributes.

Example 2. The method of example 1, wherein the particular domain of the catalog is the restaurant industry, the catalog comprises a menu for a restaurant, and the plurality of items comprises food items served by the restaurant.

Example 3. The method of example 1 or 2, wherein the programming language code comprises: source code suitable for compilation by a compiler into machine code; or machine code executable by a processor.

Example 4. The method of any of examples 1 through 3, wherein the programming language code and the specialist grammar are expressed in a common language.

Example 5. The method of any of examples 1 through 4, wherein the specialist grammar comprises an extended pattern table including one or more weighted alternative expressions.

Example 6. The method of any of examples 1 through 5, further comprising receiving the catalog of the plurality of items from a point-of-sale system.

Example 7. The method of any of examples 1 through 6, obtaining information about a business associated with the catalog; and using the information about the business in the generation of the programming language code.

Example 8. The method of any of examples 1 through 7, further comprising: receiving audio comprising speech related to the catalog; performing automatic speech recognition on the audio to generate a transcript; and using the programming language code with the transcript to derive an intent of the speech.

Example 9. The method of example 8, further comprising generating an order for one or more items of the plurality of items based on the intent.

Example 10. The method of example 8 or 9, further comprising generating a response based on the intent.

Example 11. The method of any of examples 8 through 10, further comprising using the programming language code in said performing of the automatic speech recognition to improve an accuracy of the transcript.

Example 12. The method of any of examples 1 through 7, further comprising: receiving speech audio related to the catalog from a user interface; providing the programming language code to a speech-to-text converter; performing automatic speech recognition on the speech audio, by the automatic speech recognizer, to generate a transcript using the programming language code to improve an accuracy of the natural language transcript.

Example 13. The method of example 12, further comprising using the programming language code with the transcript to derive an intent of the received speech.

Example 14. The method of example 13, further comprising generating an order for one or more items of the plurality of items based on the intent.

Example 15. The method of example 13 or 14, further comprising generating a response based on the intent.

Example 16. The method of any of examples 1 through 15, wherein the catalog includes an attribute of the one or more attributes for an individual item of the plurality of items.

Example 17. The method of any of examples 1 through 16, wherein the one or more attributes include a modifiable characteristic for an individual item; and the programming language code includes the modifiable characteristic for the individual item.

Example 18. The method of any of examples 1 through 17, further comprising: obtaining a knowledge base specific to the particular domain of the catalog; and using the knowledge base for at least some of said associating the one or more attributes to individual items of the plurality of items.

Example 19. The method of example 18, further comprising updating the knowledge base based on the catalog.

Example 20. The method of example 18 or 19, further comprising: flagging an item of the plurality of items that is unmatched in the knowledge base; receiving an attribute to associate with the flagged item; and updating the knowledge base to include the flagged item associated with the received attribute.

Example 21. At least one non-transitory machine-readable medium comprising one or more instructions that in response to being executed on a computing device cause the computing device to carry out a method or any of examples 1 through 20.

Example 22. A computer system comprising a catalog of a plurality of items, stored in a memory of the system, the catalog being specific to a particular domain and including names for individual items of the plurality of items; a knowledge base engine to respectively associate one or more attributes to the individual items of the plurality of items and store the association between the respective individual items and their associated one or more attributes in the memory of the system; a specialist grammar, stored in the memory of the system, the specialist grammar specific to the particular domain of the catalog; a code-generation engine to generate programming language code to interpret natural language input related to the catalog using the specialist grammar, and the names for the individual items of the plurality of items and their associated one or more attributes.

Example 23. The system of example 22, wherein the particular domain of the catalog is the restaurant industry, the catalog comprises a menu for a restaurant, and the plurality of items comprises food items served by the restaurant.

Example 24. The system of example 22 or 23, wherein the programming language code comprises: source code suitable for compilation by a compiler into machine code; or machine code executable by a processor.

Example 25. The system of any of examples 22 through 24, wherein the programming language code and the specialist grammar are expressed in a common language.

Example 26. The system of any of examples 22 through 25, wherein the specialist grammar comprises an extended pattern table including one or more weighted alternative expressions.

Example 27. The system of any of examples 22 through 26, further comprising an interface to a point-of-sale system to retrieve the catalog of the plurality of items from the point-of-sale system.

Example 28. The system of any of examples 22 through 27, further comprising information, stored in the memory of the system, about a business associated with the catalog; wherein the code-generation engine further uses the information about the business in the generation of the programming language code.

Example 29. The system any of examples 22 through 28, further comprising: an audio receiver; a speech recognition engine configured to perform speech recognition on audio received by the audio receiver and to generate a transcript for speech contained in the audio; and an intent engine to use the programming language code with the transcript to generate an intent of the speech.

Example 30. The system of example 29, further comprising an order generator to create an order for one or more items of the plurality of items based on the intent.

Example 31. The system of example 29 or 30, further comprising a text-to-speech generator generate a speech response based on the intent.

Example 32. The system of any of examples 29 through 31, wherein the speech recognition engine is configured to use the programming language code to improve an accuracy of the transcript.

Example 33. The system of any of examples 22 through 32, wherein the catalog includes an attribute of the one or more attributes for an individual item of the plurality of items.

Example 34. The system of any of examples 22 through 33, wherein the one or more attributes include a modifiable characteristic for an individual item; and the programming language code includes the modifiable characteristic for the individual item.

Example 35. The system of any of examples 22 through 34, further comprising: a knowledge base specific to the particular domain of the catalog stored in the memory of the system; wherein the knowledge base engine is configured to use information from the knowledge base to respectively associate the one or more attributes to the individual items of the plurality of items.

Example 36. The system of example 35, wherein the knowledge base engine is configured to update the knowledge base based on the catalog.

Example 37. The system of example 35 or 36, wherein the knowledge base engine is configured to: flag an item of the plurality of items that is unmatched in the knowledge base; receive an attribute to associate with the flagged item; and update the knowledge base to include the flagged item associated with the received attribute.

Example 38. A method comprising: ingesting a menu; identifying the names of food items;

identifying categories of the food items; clustering based on the names of the food items and their categories; and generating a domain that facilitates voice ordering from the menu.

Example 39. The method of example 38, further comprising anomaly detection based on the names and the categories.

Example 40. A method comprising: obtaining a knowledge base having food items, each having a name and a category; for at least one category, identifying words in food names within the category; ingesting a new menu having a new food item, the new food item having a name; inferring, from words in the new food item name, a category for the new food item.

Example 41. The method of example 40, further comprising: generating a domain grammar configured to facilitate voice ordering from the menu.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, $\pi$, 3.33, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments but should be defined only in accordance with the following claims and equivalents thereof.

What is claimed is:

1. A computer system comprising:
a catalog of a plurality of items, stored in a memory of the system, the catalog being specific to a particular domain and including names for individual items of the plurality of items;
a knowledge base engine to respectively associate one or more attributes to the individual items of the plurality of items and store the association between the respective individual items and their associated one or more attributes in the memory of the system;
a specialist grammar, stored in the memory of the system, the specialist grammar specific to the particular domain of the catalog; and
a code-generation engine to generate programming language code to interpret natural language input related to the catalog using the specialist grammar, and the names for the individual items of the plurality of items and their associated one or more attributes.

2. The system of claim 1, wherein the particular domain of the catalog is a restaurant industry, the catalog comprises a menu for a restaurant, and the plurality of items comprises food items served by the restaurant.

3. The system of claim 1, further comprising an interface to a point-of-sale system to retrieve the catalog of the plurality of items from the point-of-sale system.

4. The system of claim 1, further comprising:
a user interface;
an interpreter to convert an input received through the user interface into a transcript; and
an intent engine to use the programming language code with the transcript to generate an intent of the input.

5. The system of claim 4, further comprising an order generator to create an order for one or more items of the plurality of items based on the intent.

6. The system of claim 4, wherein the programming language code provides multiple weighted parses for the transcript and the intent engine selects one of the multiple weighted parses using a determination module to generate the intent of the input.

7. The system of claim 4, wherein the interpreter is configured to receive textual input through the user interface and provides the textual input as the transcript.

8. The system of claim 4, the user interface including an audio receiver; and
the interpreter including a speech recognition engine configured to perform speech recognition on audio received by the audio receiver and to generate the transcript for speech contained in the audio.

9. The system of claim 8, wherein the speech recognition engine is configured to use the programming language code to improve an accuracy of the transcript.

10. The system of claim 1, further comprising:
a knowledge base specific to the particular domain of the catalog stored in the memory of the system;
wherein the knowledge base engine is configured to use information from the knowledge base to respectively associate the one or more attributes to the individual items of the plurality of items.

11. The system of claim 10, wherein the knowledge base engine is configured to:
flag an item of the plurality of items that is unmatched in the knowledge base;
receive an attribute to associate with the flagged item; and
update the knowledge base to include the flagged item associated with the received attribute.

12. A computer-implemented method comprising:
ingesting a catalog of a plurality of items, the catalog being specific to a particular domain and including names for individual items of the plurality of items;
respectively associating one or more attributes to the individual items of the plurality of items;
obtaining a specialist grammar specific to the particular domain of the catalog; and
generating programming language code to interpret natural language input related to the catalog using the specialist grammar, and the names for the individual items of the plurality of items and their associated one or more attributes.

13. The method of claim 12, wherein the particular domain of the catalog is a restaurant industry, the catalog comprises a menu for a restaurant, and the plurality of items comprises food items served by the restaurant.

14. The method of claim 12, further comprising receiving the catalog of the plurality of items from a point-of-sale system.

15. The method of claim 12, further comprising:
receiving an input related to the catalog from a user interface;
deriving a transcript from the input; and
using the programming language code with the transcript to derive an intent of the input.

16. The method of claim 15, further comprising performing automatic speech recognition on speech audio received as the input to generate the transcript.

17. The method of claim 15, further comprising generating an order for one or more items of the plurality of items based on the intent.

18. The method of claim 15, further comprising generating an order for one or more items of the plurality of items based on the intent.

19. The method of claim 15, wherein the programming language code provides multiple weighted parses for the transcript and an intent engine selects one of the multiple weighted parses using a determination module to generate the intent of the input.

20. The method of claim 12, further comprising:
receiving speech audio related to the catalog from a user interface;
providing the programming language code to a speech-to-text converter; and
performing automatic speech recognition on the speech audio, by the speech-to-text converter, to generate a transcript using the programming language code to improve an accuracy of a natural language transcript.

21. The method of claim 20, further comprising using the programming language code with the transcript to derive an intent of the received speech.

22. The method of claim 21, further comprising generating an order for one or more items of the plurality of items based on the intent.

23. The method of claim 21, further comprising generating a response based on the intent.

24. The method of claim 12, further comprising:
obtaining a knowledge base specific to the particular domain of the catalog; and
using the knowledge base for at least some of said associating the one or more attributes to individual items of the plurality of items.

25. The method of claim 24, further comprising updating the knowledge base based on the catalog.

26. The method of claim 24, further comprising:
flagging an item of the plurality of items that is unmatched in the knowledge base;
receiving an attribute to associate with the flagged item; and
updating the knowledge base to include the flagged item associated with the received attribute.

27. At least one non-transitory machine-readable medium comprising one or more instructions that in response to being executed on a computing device cause the computing device to carry out a method comprising:
ingesting a catalog of a plurality of items, the catalog being specific to a particular domain and including names for individual items of the plurality of items;
respectively associating one or more attributes to the individual items of the plurality of items;
obtaining a specialist grammar specific to the particular domain of the catalog; and
generating programming language code to interpret natural language input related to the catalog using the specialist grammar, and the names for the individual items of the plurality of items and their associated one or more attributes.

28. The at least one non-transitory machine-readable medium of claim 27, wherein the particular domain of the catalog is a restaurant industry, the catalog comprises a menu for a restaurant, and the plurality of items comprises food items served by the restaurant.

29. The at least one non-transitory machine-readable medium of claim 27, the method further comprising receiving the catalog of the plurality of items from a point-of-sale system.

30. The at least one non-transitory machine-readable medium of claim 27, further comprising:
receiving speech audio related to the catalog from a user interface;
providing the programming language code to a speech-to-text converter; and
performing automatic speech recognition on the speech audio, by the speech-to-text converter, to generate a transcript using the programming language code to improve an accuracy of a natural language transcript.

31. The at least one non-transitory machine-readable medium of claim 30, the method further comprising using the programming language code with the transcript to derive an intent of the received speech.

32. The at least one non-transitory machine-readable medium of claim 31, the method further comprising generating an order for one or more items of the plurality of items based on the intent.

33. The at least one non-transitory machine-readable medium of claim 27, the method further comprising:
obtaining a knowledge base specific to the particular domain of the catalog; and
using the knowledge base for at least some of said associating the one or more attributes to individual items of the plurality of items.

34. The at least one non-transitory machine-readable medium of claim 27, the method further comprising:
receiving an input related to the catalog from a user interface;
deriving a transcript from the input; and
using the programming language code with the transcript to derive an intent of the input.

35. The at least one non-transitory machine-readable medium of claim 34, the method further comprising performing automatic speech recognition on speech audio received as the input to generate the transcript.

36. The at least one non-transitory machine-readable medium of claim 34, the method further comprising generating an order for one or more items of the plurality of items based on the intent.

37. The at least one non-transitory machine-readable medium of claim 34, wherein the programming language code provides multiple weighted parses for the transcript and an intent engine selects one of the multiple weighted parses using a determination module to generate the intent of the input.

* * * * *